United States Patent
Heukensfeldt Jansen et al.

(10) Patent No.: US 7,211,799 B2
(45) Date of Patent: May 1, 2007

(54) METHOD AND SYSTEM FOR CALIBRATING A TIME OF FLIGHT POSITRON EMISSION TOMOGRAPHY SYSTEM

(75) Inventors: Floribertus P. M. Heukensfeldt Jansen, Ballston Lake, NY (US); Ravindra Mohan Manjeshwar, Guilderland, NY (US)

(73) Assignee: General Electric Company, Schenectady, NY (US)

(*) Notice: Subject to any disclaimer, the term of this patent is extended or adjusted under 35 U.S.C. 154(b) by 38 days.

(21) Appl. No.: 11/226,171

(22) Filed: Sep. 14, 2005

(65) Prior Publication Data

US 2007/0057189 A1    Mar. 15, 2007

(51) Int. Cl.
*G01T 1/161* (2006.01)
(52) U.S. Cl. .................................. 250/363.09
(58) Field of Classification Search ............. 250/363.09
See application file for complete search history.

(56) References Cited

U.S. PATENT DOCUMENTS 5,272,343 A    12/1993    Stearns
6,072,177 A *  6/2000    McCroskey et al. ..... 250/252.1
6,856,666 B2   2/2005    Lonn et al.
2006/0102845 A1* 5/2006  Williams et al. ....... 250/363.03

OTHER PUBLICATIONS

M.W. Lenox, Z. Burbar, J. Young, T. Gremillion, C. Knoess, "Coincidence time alignment of high resolution planar detectors", IEEE Nuclear Science Symposium Conference Record, vol. 2, 956-959, 2002.

Y. Shao et al, "Simulation Studies of Image Quality with Time-Of-Flight PET Capability", GE Global Research, Nishkayuna, NY, Abstract of presentation given Oct. 22, 2004, 2004 IEEE Nuclear Science Symposium, Medical Imaging Conference.

* cited by examiner

*Primary Examiner*—David Porta
*Assistant Examiner*—Marcus Taningco
(74) *Attorney, Agent, or Firm*—Dean D. Small; Small Patent Law Group (57) ABSTRACT

A method and system for calibrating a Time of Flight Positron Emission Tomography (TOF PET) system are provided. The method includes storing acquired scan data from detector pairs. The acquired scan data includes image data and timing information. The method further includes reconstructing images using scan data. The method also includes determining a timing correction for each detector based on intensity distribution histograms of emission sources. The system includes a controller, which is configured to perform the above-mentioned method steps.

15 Claims, 7 Drawing Sheets

METHOD AND SYSTEM FOR CALIBRATING A TIME OF FLIGHT POSITRON EMISSION TOMOGRAPHY SYSTEM

BACKGROUND OF THE INVENTION

This invention relates generally to Time of Flight (TOF) Positron Emission Tomography (PET) systems and, more particularly, to calibration of TOF PET systems.

A PET system generates images that represent the distribution of positron-emitting nuclides within the body of a patient. When a positron interacts with an electron by annihilation, the entire mass of the positron-electron pair is converted into two 511 keV photons. The photons are emitted in opposite directions along a line of response. The annihilation photons are detected by detectors that are placed along the line of response on a detector ring. When these photons are detected at the detector elements within a small pre-determined time window, the detection is referred to as coincidence. The scan data, collected by the PET scanner, is a collection of all the coincidences along the various lines of response. An image is then generated from the acquired coincidence data through a process called image reconstruction.

Image quality may be improved by including time-of-flight (TOF) information of the emission data. Strictly speaking, TOF is the time taken by an annihilation photon to travel from the origin of annihilation to detector elements along the line of response, but this cannot be measured directly since the time at which the emission takes place is not known. Therefore, TOF usually refers to the difference in the time at which the photons are detected by the detector elements. The timing difference is used to localize the source of emission along the line joining two detector elements in a TOF PET system.

With time and usage, the PET scanner requires a number of precise timing calibration operations to ensure effective operation. If differences in the arrival time of emission source responses at detectors in a detector pair are biased, the image reconstruction process will shift data along a line between the detectors. Such shifts will introduce additional noise in the image, thus offsetting the main advantage that is expected from a high performance TOF PET system.

Known calibration operations are carried out manually by an operator and based on a recommended schedule, to determine and correct for potential timing biases between detector pairs. However, the manual method is only effective in determining state of a system when data is acquired, which is typically once per day before the first patient is imaged. A state of the PET scanner may change during the course of the day, for example, due to temperature changes in the scanner. Such changes may affect calibration of the scanner and may go unnoticed unless the operator initiates the calibration procedure at some other time.

Known methods for calibration of the TOF PET system require additional operations to acquire the calibration data, which are performed when there is no patient being scanned. However, this results in a loss of operational time of the TOF PET scanner.

BRIEF DESCRIPTION OF THE INVENTION

In an embodiment of the invention, a method for calibrating a time of flight (TOF) positron emission tomography (PET) system is provided. The method includes storing acquired scan data from detectors, which includes coincidence data and timing information. The method further includes reconstructing images using scan data. The method also includes determining a timing correction for each detector based on intensity distribution of emission sources and timing histograms.

In another embodiment of the invention, a PET system is provided. The PET system includes a plurality of detectors, which are utilized in performing imaging scans. The PET system also includes a processor to determine a timing correction for each detector. The processor is configured to bin acquired coincidence data from the detectors and timing information associated with the coincidence data. The processor is further configured to reconstruct images using the scan data, calculate an intensity distribution from the reconstructed images and a timing histogram for each detector pair from the timing information, and determine timing corrections for each detector based on a median of the intensity distribution and the timing histogram.

DETAILED DESCRIPTION OF THE INVENTION

Various embodiments of the invention provide a method and system for automatic calibration of a Time of Flight (TOF) Positron Emission Tomography (PET) system by using scan data obtained during scanning. The method for calibration of a TOF PET system uses patient scan data for determining timing correction.

Figure 1:
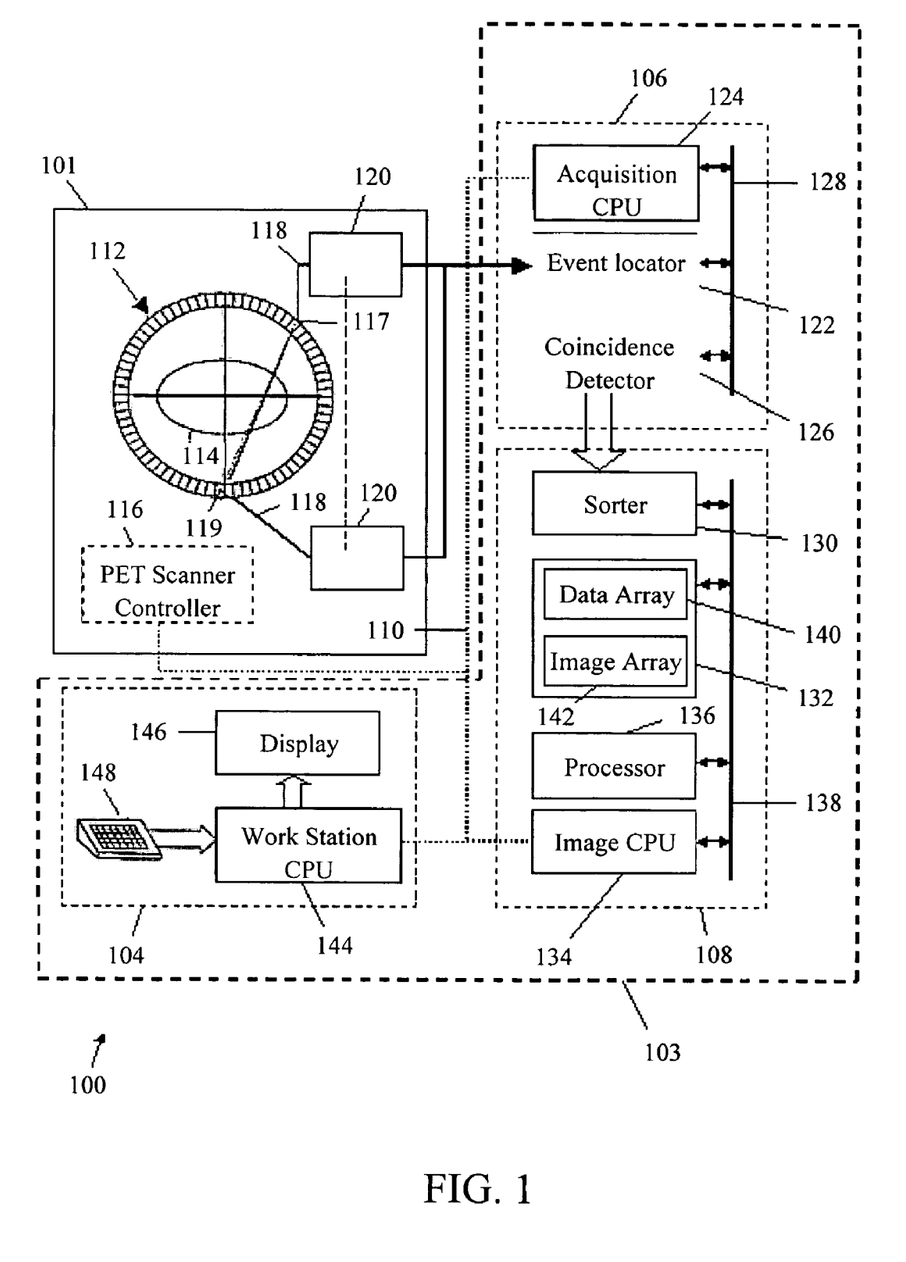
FIG. 1 is a block diagram illustrating a Positron Emission Tomography (PET) system in accordance with an exemplary embodiment of the invention.

FIG. 1 is a block diagram illustrating a Positron Emission Tomography (PET) system 100, in accordance with an exemplary embodiment of the invention. PET system 100 includes a PET scanner 101 and a controller 103. Controller 103 is configured to control PET scanner 101, which acquires scan data during a scanning operation. In an embodiment of the invention, controller 103 may be configured to determine whether calibration is required by PET system 100 based on the acquired scan data. In another embodiment of the invention, controller 103 may be configured to calibrate PET system 100. In an embodiment of the invention, PET system 100 is a TOF PET system.

Controller 103 includes an operator workstation 104, a data acquisition processor 106 and an image reconstruction processor 108. PET scanner 101, operator workstation 104, data acquisition processor 106 and image reconstruction processor 108 are interconnected via a communication link 110, for example, a serial communication or a wireless link. PET scanner 101, also referred as a gantry, acquires scan data and transmits the scan data to data acquisition processor 106. The operation of PET scanner 101 is controlled from operator workstation 104. The data acquired by data acquisition processor 106 is reconstructed using a reconstruction processor 108.

PET scanner 101 may operate using, for example, a plurality of detector rings. One such detector ring, detector ring 112, is illustrated in FIG. 1. Detector ring 112 includes a central opening, in which a patient 114 may be positioned using such as, a motorized table, that is aligned with the central axis of detector ring 112. The motorized table moves patient 114 into central opening of detector ring 112, in response to one or more commands received from operator workstation 104. A PET scanner controller 116, also referred to as the gantry controller, is provided within PET scanner 101. PET scanner controller 116 responds to the commands received from operator workstation 104 through communication link 110. Therefore, the operation of PET scanner 101 is controlled from operator workstation 104 through PET scanner controller 116.

Detector ring 112 includes a plurality of detectors. For example, in the GE Discovery™ ST PET, a diagnostic imaging system by GE Healthcare, there are 420 detector crystals per ring, and 24 rings in the scanner. Detector ring 112 includes a detector 117, a detector 119, and several other detectors. Detector 117, like other detectors, includes a set of scintillator crystals arranged in a matrix that is disposed in front of a plurality of photomultiplier tubes (e.g., four tubes). When a photon collides with a crystal on a detector, it produces scintillation in the crystal. Each photomultiplier tube in the vicinity of this scintillation produces an analog signal on communication line 118 when a scintillation event occurs. A set of acquisition circuits 120 is provided within PET scanner 101 to receive these analog signals. Acquisition circuits 120 produce digital signals indicating the location and total energy of the event. Acquisition circuits 120 also produce an event detection pulse, which indicates the time or moment the scintillation event occurred. These digital signals are transmitted through a communication link, for example, a cable, to an event locator 122 in data acquisition processor 106.

Data acquisition processor 106 includes event locator 122, an acquisition CPU 124 and a coincidence detector 126. Data acquisition processor 106 periodically samples the signals produced by acquisition circuits 120. Acquisition CPU 124 controls communications on a back-plane bus 128 and on communication link 110. Event locator 122 processes the information regarding each valid event, and provides a set of digital numbers or values indicative of the detected event. For example, the information indicates when the event took place and the position of the scintillation crystal that detected the event. An event data packet is communicated to coincidence detector 126 through back-plane bus 128. Coincidence detector 126 receives the event data packets from event locator 122 and determines if any two of the detected events are in coincidence. Coincidence is determined by a number of factors. First, the time markers in each event data packet must be within a predetermined time period, for example, 12.5 nanoseconds, of each other. Second, a line of response (LOR) formed by a straight line joining the two detectors that detect the coincidence event should pass through the field of view in PET scanner 101. Events that cannot be paired are discarded. Coincident event pairs are located and recorded as a coincidence data packet that is conveyed through a communication link to a sorter 130 in image reconstruction processor 108.

Image reconstruction processor 108 includes sorter 130, a memory module 132, an image CPU 134, a processor 136 and a back-plane bus 138. Sorter 130 counts all events occurring along each projection ray and organizes them into a 3D data structure, also referred to as sinograms. In an embodiment of the invention, the 3D data (or sinograms) is organized as a data array 140. Data array 140 is stored in memory module 132. Back-plane bus 138 is linked to communication link 110 through image CPU 134. Image CPU 134 controls communication through back-plane bus 138. Processor 136 is also connected to back-plane bus 138. Processor 136 receives data array 140 as an input and reconstructs images in the form of image arrays 142. Resulting image arrays 142 are stored in memory module 132. In one embodiment of the invention, image reconstruction processor 108 may be configured to determine a timing correction in order to calibrate PET scanner 101. The method steps performed by image reconstruction processor 108 to determine the timing correction for calibrating PET scanner 101 are further explained in conjunction with FIG. 3.

The images stored in image array 142 are communicated by image CPU 134 to operator workstation 104. Operator workstation 104 includes a CPU 144, a display device 146 and an input device 148. CPU 144 connects to communication link 110 and receives inputs (e.g., user commands) from input device 148. Input device 148 may be, for example, a keyboard, mouse, or a touch-screen panel. Through input device 148 and associated control panel switches, the operator may control the calibration of PET scanner 101, the configuration of PET scanner 101, and the positioning of object 114 for a scan through input device 148 and associated control panel switches. Similarly, the operator may control the display of the resulting image on display device 146 and perform image-enhancement functions using programs executed by workstation CPU 144.

Figure 2:
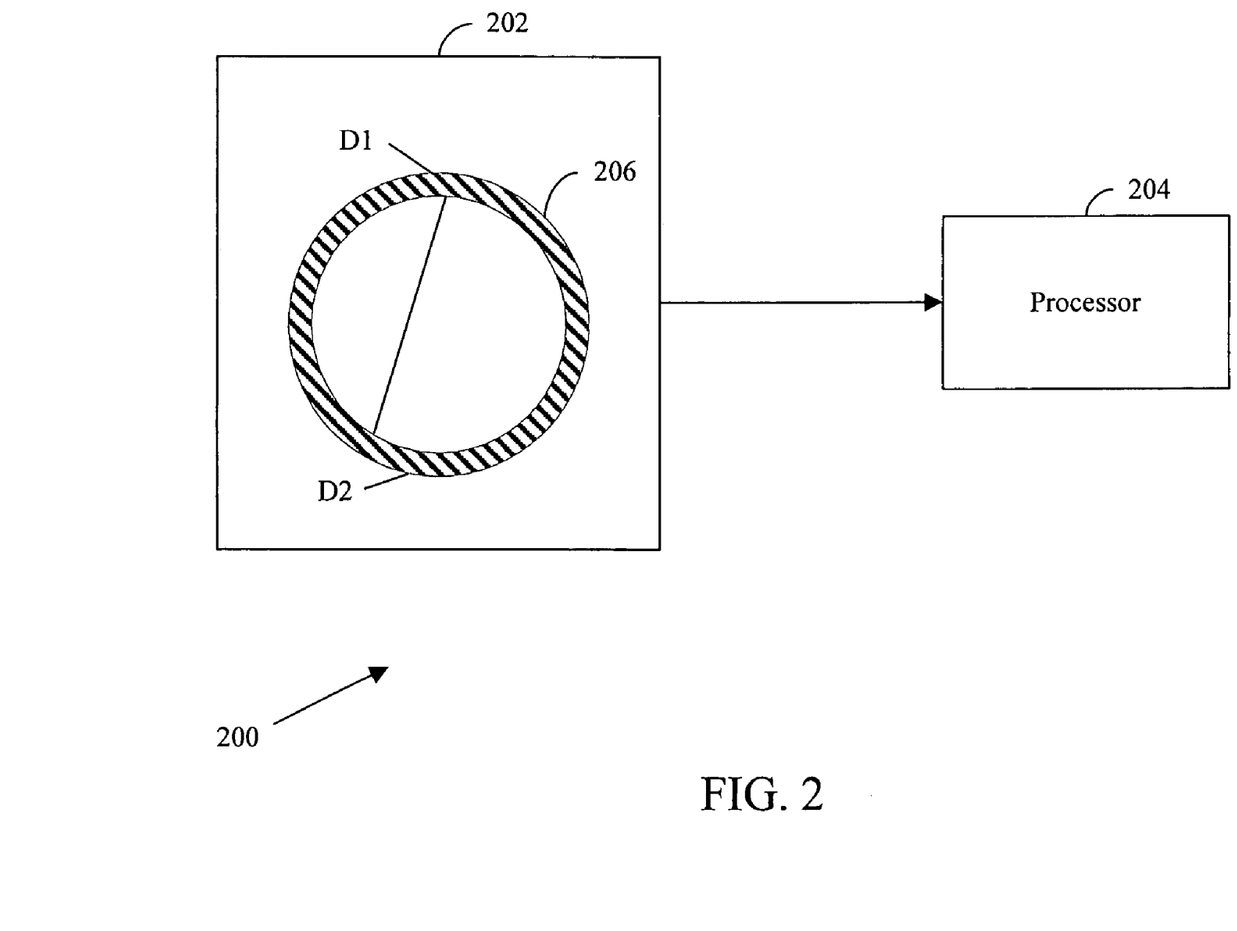
FIG. 2 is a block diagram illustrating a Positron Emission Tomography (PET) system in accordance with another embodiment of the invention.

FIG. 2 is a block diagram illustrating a Positron Emission Tomography (PET) system 200 in accordance with another embodiment of the invention. PET System 200 includes a processor 204 and a plurality of detectors 206. In an embodiment of the invention, detectors 206 are arranged in a ring structure.

FIG. 2 shows an LOR formed by a straight line joining two detectors D1 and D2. Processor 204 acquires and stores the scan data obtained from scanner 202. PET system 200 may be a TOF PET system.

Figure 3:
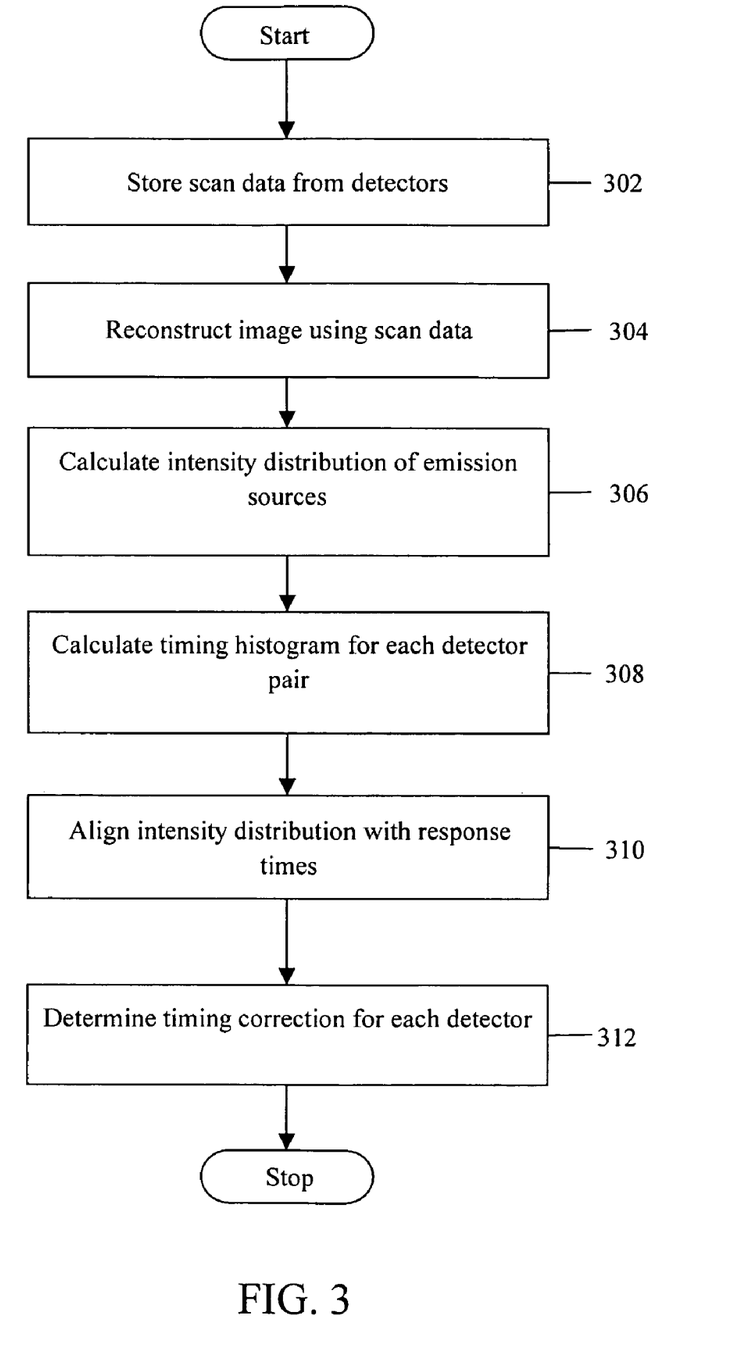
FIG. 3 is a flowchart illustrating a method for calibrating a TOF PET system in accordance with an exemplary embodiment of the invention.

FIG. 3 is a flowchart illustrating a method for calibrating PET scanner 101 in accordance with an exemplary embodiment of the invention. At 302, scan data from detectors is acquired and stored. The scan data includes coincidence data and timing information. In an embodiment of the invention, detector ring 112 of PET system 100 acquires the scan data during a scanning operation and bins the scan data in multiple sinograms. At 304, an image is reconstructed using scan data obtained at 302. Image reconstruction from the scan data includes reconstructing an image from emission source responses. Further, image reconstruction includes reconstruction of an image from known emission source positions such as, for example, a pin source. In an embodiment of the invention, processor 204 carries out the image reconstruction at 304.

At 306, intensity distribution of emission sources is calculated. Intensity distribution of sources is calculated using reconstruction of the image using known methods. If a known source such as a phantom has an unknown position, then the intensity distribution is calculated using a combination of image reconstruction and spatial correction. At 308, timing histograms are calculated for each detector pair using the scan data. A detector pair includes detectors in detector ring 112 that lie across the LOR. Intensity distribution profile for a detector pair is further explained in accordance with FIG. 5. Timing histograms for a detector pair are further explained in conjunction with FIG. 6.

At 310, the intensity distribution is aligned with corresponding response times. For each detector pair, i.e. across an LOR, a corresponding intensity distribution profile is determined without making correction for random events. For each intensity distribution profile, a corresponding timing histogram is obtained from the sinograms of the scan data. Further, for each intensity distribution profile a median is determined. In addition, a point in the timing histogram that corresponds to the median of the intensity distribution profile is determined. If the point is at a certain distance from the mid-point of the LOR, then the time difference is given by $\Delta t$:

$$\Delta t = \frac{2X}{c} \qquad (1)$$

where, X is the distance of the point corresponding to the median of the intensity distribution profile from the mid-point of the LOR;

c is the velocity of light in vacuum;

further, a timing pivot is defined in the timing histogram as an interval represented by two end points (mid+0.5 δt, mid−0.5 δt), where δt is the width of a timing bin. Thus, the timing pivot has a width of δt. As used here, mid corresponds to the point of the timing histogram that corresponds to X in the intensity profile.

For each detector, detector events, i.e. the emission source responses captured by the detector across all the lines of response, are classified as one of slower than the timing pivot, faster than the timing pivot, and approximately equal to the timing pivot. The classified events are collected in three classification bins S, M, and F. S corresponds to the events that are slower than the timing pivot, M corresponds to the events that are approximately equal to the timing pivot, and F corresponds to the events that are faster than the timing pivot. Additionally, for each detector the S, M, and F events are incremented for each LOR. In one embodiment of the invention, processor 204 performs alignment of intensity distribution with corresponding response times. The classification of events in the three classification bins S, M, and F is further explained in conjunction with FIG. 7.

In the case of a well-calibrated detector, after classifying the detector events captured by the detector across all the lines of response, the number of events in the classification bins S and F are statistically not different. Hence, if the number of events in the classification bins S and F are different and difference between the number of events is above a statistically significant number, a timing correction is needed.

The detector as used herein refers to either a single crystal or a group of crystals that share commonality in the data acquisition and processing path and that can therefore be assumed to have a common timing drift (for example, multiple crystals that are coupled to the same photomultiplier).

At 312, a timing correction for each detector is determined. The timing correction for each detector is determined by adjusting timing information such that the number of detector events in classification bin S and the number of detector events in classification bin F are statistically equal. In one embodiment of the invention, processor 204 determines the timing correction for each detector.

In an embodiment of the invention, the timing correction for each detector is determined by adjusting detector timing information according to equation (2).

$$\Delta t = \delta t \left( \frac{F-S}{2M} \right) \qquad (2)$$

where,

F corresponds to number of detector events in classification bin F;

S corresponds to number of detector events in classification bin S;

M corresponds to number of detector events in classification bin M;

δt corresponds to the width of classification bin M, i.e., width of the timing pivot;

and Δt is timing correction based on the number of faster and slower events. Δt is a timing correction utilized to calibrate the detector. In other words, a shift in timing that is needed to equalize the number of events in the classification bins S and F may be visualized as being obtained when timing window slides across the histogram by Δt. As a result, the number of events that is added to the classification bin S is equal to $$\frac{M\Delta t}{\delta t},$$

and an equal number of events are taken from the classification bin F. In an embodiment of the invention, when Δt is statistically significant, then the timing correction for each detector is performed by adjusting detector timing information by Δt. The statistical significance of Δt is determined to ensure that only significant shifts are applied.

In an exemplary embodiment of the invention, determination of the statistical significance of Δt is determined in the following manner. Assuming that the detector is well calibrated, it can be approximated that F=S. Accounting for the fact that some events would appear in M, it can be stated that F+M/2=S+M/2. If we put F+M/2=f, and S+M/2=s, then a value T can be given by, $$T = abs\left( \frac{(f+s)/2 - f}{\sigma} \right)$$

where σ corresponds to standard deviation and using the normal approximation of the binomial distribution, the standard deviation is given by $$\sigma = \sqrt{(f+s) \cdot p \cdot (1-p)}$$

where p is the probability of a particular event f or s, so in this case p=0.5 hence, σ=0.5√(f+s)

and $$T = abs\left(\frac{s-f}{\sqrt{s+f}}\right)$$

The shift would be considered significant at the 95% level if T>1.645.

In an embodiment of the invention, the timing pivot can correspond to a point with little or no activity; in this case, the M bin might have very few counts and timing correction Δt could be overestimated. In such case, a shift will not be applied if M<q*(F+S), where q is a parameter to be estimated. In an embodiment of the invention, q is estimated in the following manner. Data is obtained on a well-calibrated system for a uniform flood phantom with a diameter (D) that is large compared to the timing resolution (dt) of the system, i.e., D>>c*dt, where c=velocity of light in vacuum. For example, if dt=500 ps, then D>>15 cm. The events are classified in the classification bins F, M, and S as described above, and then a ratio is computed, q'=M/(F+S). The estimated value of q would be, for example, q=q'/4.

A single acquisition may not yield enough counts in the classification bins S, M, and F to generate a statistically significant signal that may be used to determine the timing correction for a detector. In such case, the scan data is collected continuously during further patient scanning. However, earlier counts in the classification bins S, M and F may mask a recent drift. In one embodiment of the invention, the effect of earlier counts is negated by resetting counters of the classification bins to zero after reaching a certain count density. Resetting of the counters ensures that a sudden shift after a long period of stability does not go undetected. In another embodiment of the invention, counters of the classification bins are divided by a number such as, for example, two, which reduces the effect of earlier counts over time. Dividing the counters of classification bins by a number ensures that a more recent drift is detected. In an embodiment of the invention, the method of dividing the counters of the classification bins by a number to reduce the effect of earlier counts is performed when the counters of the classification bins reach a level without a statistically significant shift being detected.

In an embodiment of the invention, processor 204 is configured to acquire and store scan data from detectors. Further, processor 204 reconstructs images using the scan data, and calculates an intensity distribution from the scan data. Finally, processor 204 determines timing corrections for each detector based on a median of the intensity distribution and the timing histogram.

In an embodiment of the invention, controller 103 carries out calibration of PET scanner 101. Further, controller 103 determines the timing correction and adjusts the timing information such that the number of slower detector events and the number of faster detector events are not statistically different. In another embodiment of the invention, controller 103 carries out calibration of a plurality of detectors using scan data acquired for a number of image acquisitions that include timing information.

In an embodiment of the invention, controller 103 stores timing correction data for PET scanner 101 over time. The timing correction data stored over time may be used to perform preventive maintenance of PET scanner 101.

In another embodiment of the invention, processor 204 of TOF PET system 200 calculates the timing correction for scanner 202, and carries out the calibration of scanner 202. Further, processor 204 also stores timing correction data for scanner 202.

Figure 4:
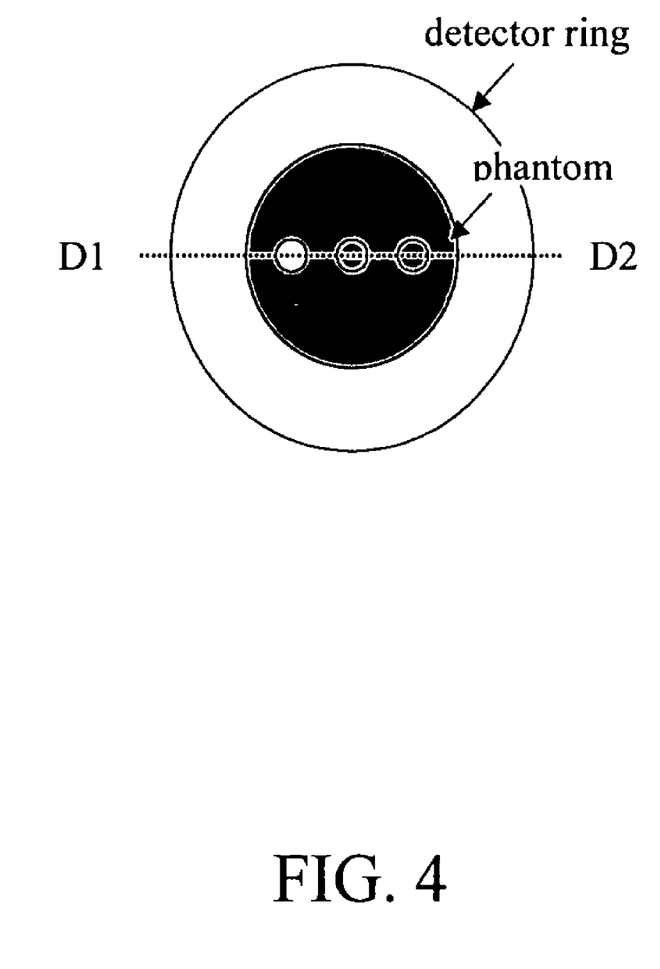
FIG. 4 is a diagram illustrating a detector ring with a known source of emission, in accordance with an exemplary embodiment of the invention.

FIG. 4 is a diagram illustrating shows a detector ring with a known source of emission, in accordance with an exemplary embodiment of the invention. FIG. 4 shows a detector ring with detectors D1 and D2, and a known source of emission, i.e., a phantom in the detector ring. Detector pair D1–D2 obtains emission profile from phantom. A line passing through detector pair D1–D2 is known as an LOR.

Figure 5:
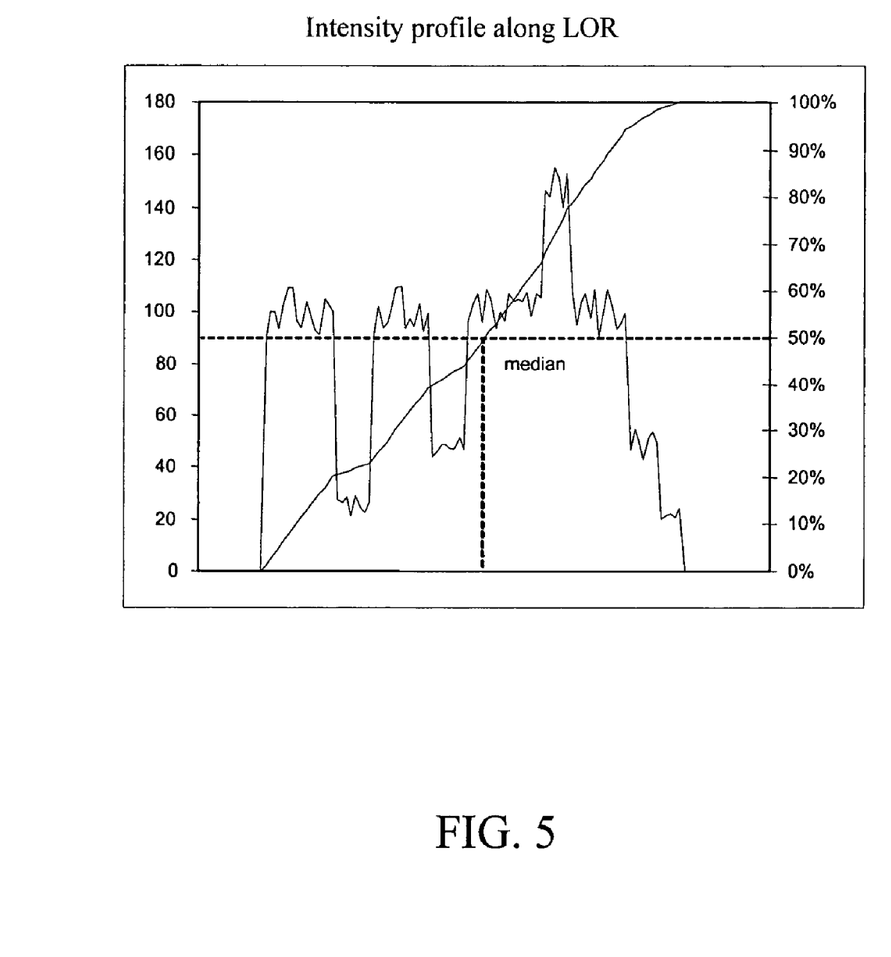
FIG. 5 is a diagram illustrating an intensity profile of emission sources along line of response (LOR), in accordance with an exemplary embodiment of the invention.

FIG. 5 is a diagram illustrating an intensity profile of emission sources along the LOR, in accordance with an exemplary embodiment of the invention. Using the scan data, the intensity profile of emission sources along the LOR is determined. Further, for the intensity profile a median is determined.

Figure 6:
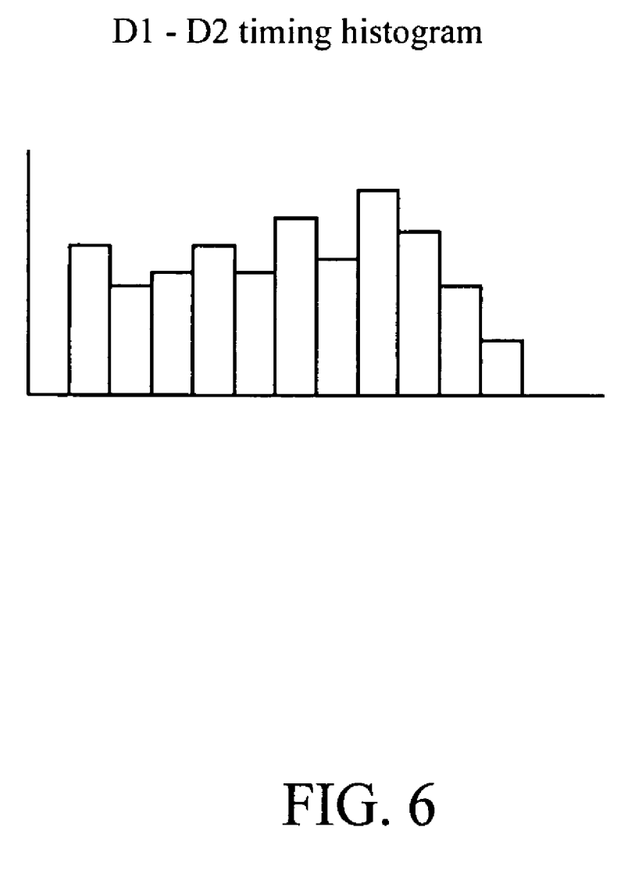
FIG. 6 is a diagram illustrating a timing histogram for a detector pair, in accordance with an exemplary embodiment of the invention.

FIG. 6 is a diagram illustrating a timing histogram for a detector pair, in accordance with an exemplary embodiment of the invention. Using the timing information obtained from the scan data, the timing histogram for each detector pair is determined. FIG. 6 shows an exemplary timing histogram for a detector pair D1 and D2. Using the median of the intensity distribution profile the detector events are classified into three classification bins S, M, and F, as described above.

Figure 7:
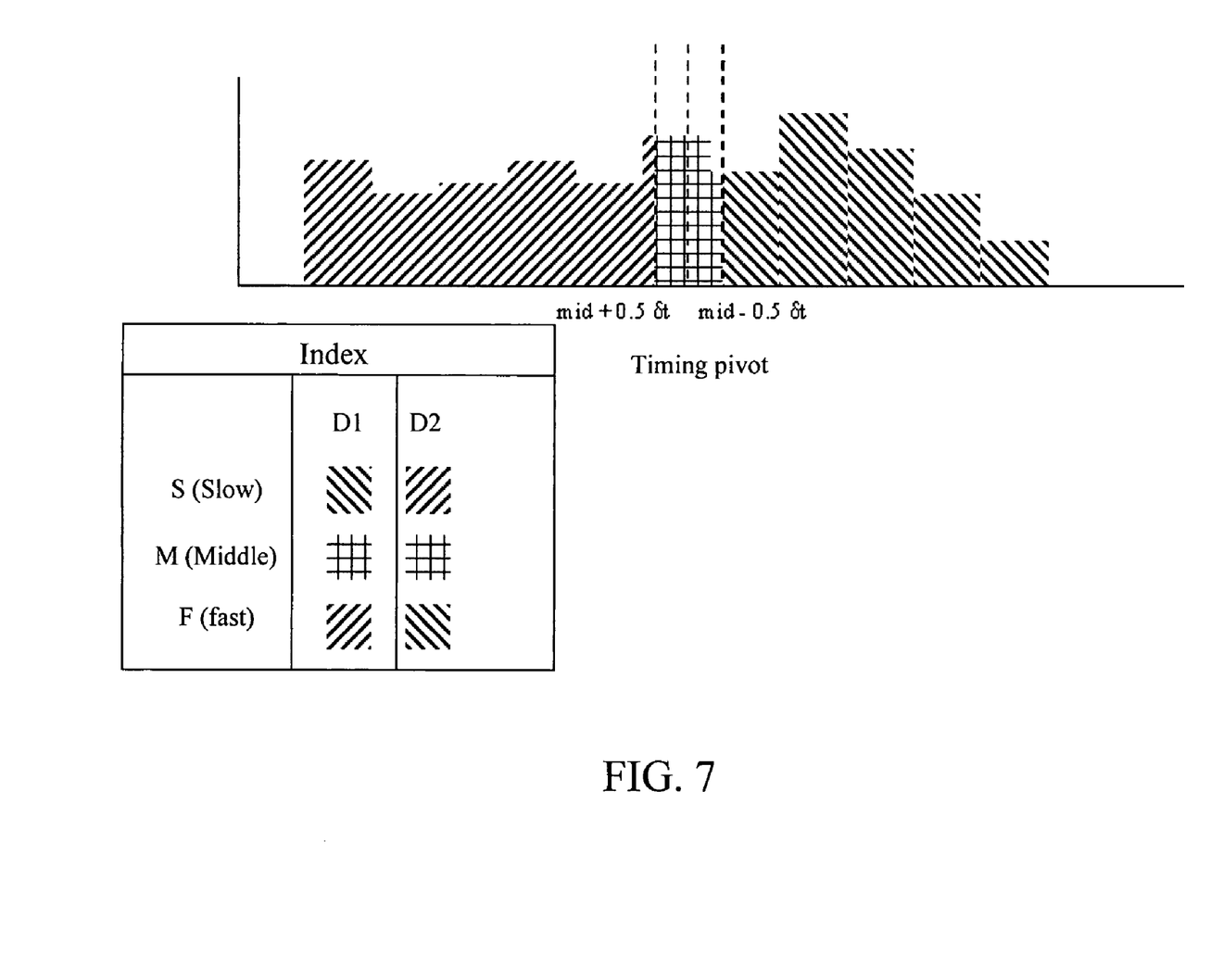
FIG. 7 is a diagram illustrating a timing histogram for a detector pair with classification of detector events in classification bins, in accordance with an exemplary embodiment of the invention.

FIG. 7 is a timing histogram for a detector pair with classification of detector events in classification bins, in accordance with an exemplary embodiment of the invention. The classification bins are S bin that corresponds to events slower than the timing pivot, F bin that corresponds to events faster than the timing pivot, and M bin that corresponds to events approximately equal to the timing pivot. FIG. 7 shows the classification of detector events for a detector pair D1 and D2. The index in FIG. 7 gives the classification of detector events for detectors D1 and D2. The timing histogram with classification of the detector events is used for determining the timing correction for the detectors. For any given pair of detectors, for example, detectors D1 and D2, events on the LOR joining the detectors, that are classified in S bin for one detector (D1, for example) will be classified in F bin for the other detector (D2, for example).

Various embodiments of the invention provide a TOF PET system that acquires calibration data during an imaging operation. The TOF PET system does not require the system to be made unavailable for patient imaging in order to obtain calibration data. Further, with calibration data being obtained during an imaging operation, the TOF PET system may be calibrated more than once per day. Additionally, various embodiments of the invention provide a TOF PET system that stores timing corrections for a plurality of detectors over time. The stored timing corrections may be used for preventive maintenance and calibration of the TOF PET system.

Various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for calibrating a time of flight (TOF) positron emission tomography (PET) scanner, said method comprising:
    storing acquired scan data from detector pairs including image data and timing information;
    reconstructing images using the scan data;
    calculating an intensity distribution of emission sources from the images;
    calculating a timing histogram for each detector pair;
    aligning the intensity distribution with corresponding response times; and
    determining a timing correction for each detector based on a corresponding median of intensity histogram.

2. A method according to claim 1 further comprising at least one of reconstructing images using emission source responses to get an estimate of source distribution for use in determining timing corrections and utilizing known emission source positions in determining timing corrections.

3. A method according to claim 1 wherein aligning the intensity distribution comprises determining a number of detector events that are one of slower than a timing pivot, faster than the timing pivot, and approximately equal to the timing pivot response times for each detector pair.

4. A method according to claim 1 wherein:
    aligning the intensity distribution comprises determining a number of detector events that are one of slower than the timing pivot, faster than the timing pivot, and approximately equal to the timing pivot response times for each detector pair; and
    determining a timing correction for each detector comprises adjusting timing information such that the number of slower detector events and the number of faster detector events are approximately equal.

5. A method according to claim 1 wherein determining a timing correction for each detector comprises determining the timing correction when the number of samples in the intensity distribution is above a statistically significant, predetermined number.

6. A method according to claim 1 wherein aligning the intensity distribution comprises:
    counting a number of detector events that are one of slower than the timing pivot, faster than the timing pivot, and approximately equal to the timing pivot response times for each detector pair; and
    incrementing the appropriate count for each line of response.

7. A method according to claim 1 wherein determining a timing correction for each detector comprises adjusting detector timing information according to $$\Delta t = \delta t \left( \frac{F-S}{2M} \right),$$

where F is a count of detector events faster than a timing pivot, S is a count of detector events slower than a timing pivot, and M is a count of detector events between the slower and faster detector event counts.

8. A method according to claim 1 wherein determining a timing correction for each detector comprises:
    adjusting detector timing information according to $$\Delta t = \delta t \left( \frac{F-S}{2M} \right)$$

when $\Delta t$ has a value that is equal to or greater than a statistically significant, predetermined value, where F is a count of detector events faster than a timing pivot, S is a count of detector events slower than a timing pivot, and M is a count of detector events between the slower and faster detector event counts.

9. A positron emission tomography (PET) system comprising:
    a plurality of detectors utilized in performing imaging scans; and
    a processor configured to determine a timing correction for each detector, said processor configured to bin acquired image scan data from said detector and timing information associated with the scan data, reconstruct images using the scan data, calculate an intensity distribution from the scan data and a timing histogram for each detector pair from the timing information, and determine timing corrections for each detector based on a median of the intensity histogram.

10. A PET system according to claim 9 wherein said processor is configured to either reconstruct images using emission source responses to get an estimate of source distribution for use in determining timing corrections or utilize known emission source positions in determining timing corrections.

11. A PET system according to claim 9 wherein said processor is configured to determine a number of detector events that are one of slower than the timing pivot, faster than the timing pivot, and approximately equal to the timing pivot response times for each detector pair.

12. A PET system according to claim 9 wherein said processor is configured to:
   determine a number of detector events that are one of slower than the timing pivot, faster than the timing pivot, and approximately equal to the timing pivot response times for each detector pair; and
   adjust timing information such that the number of slower detector events and the number of faster detector events are approximately equal.

13. A PET system according to claim 9 wherein said processor is configured to determine the timing correction when the number of samples in the intensity distribution is above a statistically significant, predetermined number.

14. A PET system according to claim 9 wherein to align a median of the intensity distribution, said processor is configured to:
   count a number of detector events that are one of slower than the timing pivot, faster than the timing pivot, and approximately equal to the timing pivot response times for each detector pair; and
   increment the appropriate count for each line of response.

15. A PET system according to claim 9 wherein said processor is configured to adjust detector timing information according to $$\Delta t = \delta t \left( \frac{F - S}{2M} \right),$$

where F is a count of detector events faster than a timing pivot, S is a count of detector events slower than a timing pivot, and M is a count of detector events between the slower and faster detector event counts.

* * * * *

UNITED STATES PATENT AND TRADEMARK OFFICE
CERTIFICATE OF CORRECTION

PATENT NO. : 7,211,799 B2
APPLICATION NO. : 11/226171
DATED : May 1, 2007
INVENTOR(S) : Heukensfeldt Jansen et al.

It is certified that error appears in the above-identified patent and that said Letters Patent is hereby corrected as shown below:

Replace the equation in Claim 7, column 10, line 33, (containing an extra parentheses after $2M$)

$$\Delta t = \delta t \left( \frac{F-S}{2M)} \right)$$

with the following equation:

$$\Delta t = \delta t \left( \frac{F-S}{2M} \right)$$

Replace the equation in Claim 8, column 10, line 46, (containing an extra parentheses after $2M$)

$$\Delta t = \delta t \left( \frac{F-S}{2M)} \right)$$

with the following equation:

$$\Delta t = \delta t \left( \frac{F-S}{2M} \right)$$

UNITED STATES PATENT AND TRADEMARK OFFICE
CERTIFICATE OF CORRECTION

PATENT NO. : 7,211,799 B2
APPLICATION NO. : 11/226171
DATED : May 1, 2007
INVENTOR(S) : Heukensfeldt Jansen et al.

It is certified that error appears in the above-identified patent and that said Letters Patent is hereby corrected as shown below:

And, replace the equation in Claim 15, column 12, line 16, (containing an extra parentheses after $2M$)

$$\Delta t = \delta t \left( \frac{F-S}{2M)} \right)$$

with the following equation:

$$\Delta t = \delta t \left( \frac{F-S}{2M} \right)$$

Signed and Sealed this

First Day of July, 2008

JON W. DUDAS
*Director of the United States Patent and Trademark Office*